US008875226B1

(12) United States Patent
Marek

(10) Patent No.: US 8,875,226 B1
(45) Date of Patent: Oct. 28, 2014

(54) HIGH ASSURANCE CLASSIFICATION LEVEL DISAMBIGUATION FOR DISPLAYS

(75) Inventor: James A. Marek, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/523,256

(22) Filed: Jun. 14, 2012

(51) Int. Cl.
*G06F 21/00* (2013.01)
*G06F 3/0481* (2013.01)
*G06F 21/84* (2013.01)

(52) U.S. Cl.
CPC ...... *G06F 3/0481* (2013.01); *G06F 2221/2113* (2013.01); *G06F 21/84* (2013.01)
USPC .......... 726/1; 726/3; 726/12; 726/17; 726/26; 726/27; 713/166; 715/202; 715/204; 715/727; 715/803

(58) Field of Classification Search
CPC .. G06F 21/84; G06F 3/048; G06F 2221/2113
USPC ........... 726/1, 3, 12, 17, 21, 26, 27; 713/166; 709/217, 228; 715/803, 204
See application file for complete search history.

(56) References Cited

U.S. PATENT DOCUMENTS 7,607,167 B1 * 10/2009 Johnson et al. .................... 726/3
2009/0150824 A1 * 6/2009 Furuichi ....................... 715/803

\* cited by examiner

*Primary Examiner* — Kambiz Zand
*Assistant Examiner* — Noura Zoubair
(74) *Attorney, Agent, or Firm* — Donna P. Suchy; Daniel M. Barbieri

(57) ABSTRACT

A method for disambiguating entities on a multi-level security display includes receiving a selection of a particular security level and rendering entities having a different security level in a visually distinct way. Visual distinction may include not drawing the entities on the multi-level security display.

18 Claims, 3 Drawing Sheets

HIGH ASSURANCE CLASSIFICATION LEVEL DISAMBIGUATION FOR DISPLAYS

FIELD OF THE INVENTION

The present invention is directed generally toward computer displays and more particularly toward information display in an environment having multiple security levels.

BACKGROUND OF THE INVENTION

In applications requiring access to information from multiple, distinct levels of classification or security, a user may have multiple displays; each display only showing information from a single classification or security level. Such systems simplify the process of segregating information, but complicate the process of correlating the information.

Multi-level security (MLS) displays may integrate information from several different classification or security levels, but in applications where information from multiple, different classification or security levels is rendered on a MLS display, a user may have substantial difficulty determining the classification level of any particular piece of information. Such difficulty can cause confusion and information leakages.

Traditionally, all information on a MLS display is indicated at the highest classification or security level of any single piece of information; the user is then left to determine the actual classification or security level of a particular piece of information (entity) based on the user's judgment. Such a system is prone to user error.

Consequently, it would be advantageous if an apparatus existed that is suitable for providing a secure, high assurance visual indication of entities within a particular classification or security level.

SUMMARY OF THE INVENTION

Accordingly, the present invention is directed to a novel method and apparatus for providing a secure, high assurance visual indication of entities within a particular classification or security level.

One embodiment of the present invention is a computer system with a MLS display, an input device and a processor. A user may select a desired classification or security level with the input device, and the processor will render entities onto the MLS display, de-emphasizing entities outside the selected classification or security level.

Another embodiment of the present invention is a computer system with a MLS display, an input device and a processor. A user may select a classification or security level with the input device, and the processor will render entities onto the MLS display, de-emphasizing entities within the selected classification or security level.

Another embodiment of the present invention is a method for de-cluttering a MLS display including receiving a desired classification or security level from a user, referencing a database associating each entity on a MLS display with a classification or security level, and rendering only those entities at or below the selected classification or security level on the MLS display.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
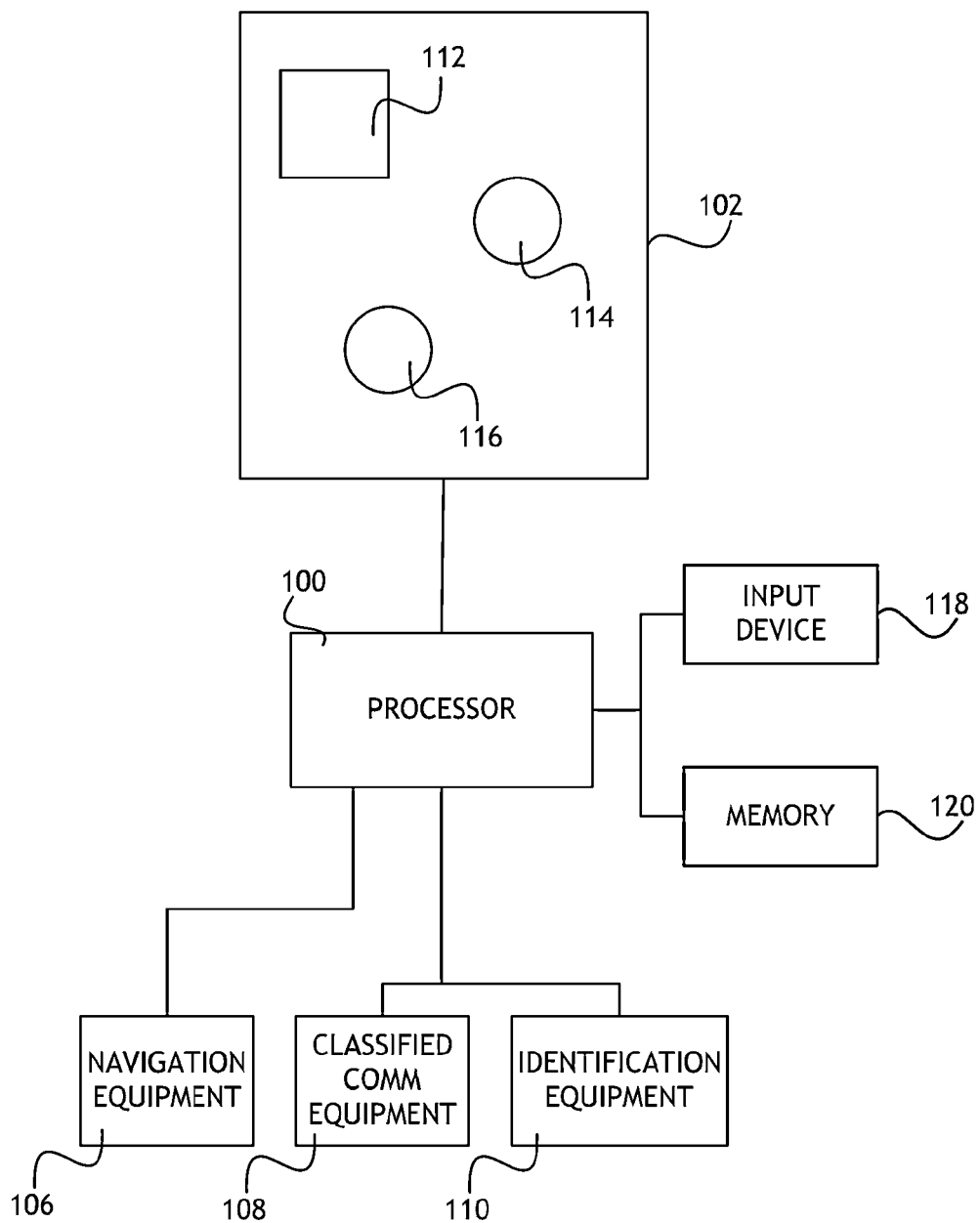
FIG. 1 shows a block diagram of a system for displaying data having multiple security levels.

Referring to FIG. 1, a block diagram of a system for displaying data having multiple security levels is shown. The system may include a processor 100. The processor may be connected to a MLS display 102. The MLS display 102 may render one or more entities 112, 114, 116; and each of the one or more entities 112, 114, 116 may be associated with a different security level. For example, a first entity 112 may be associated with a security level such as "unclassified" while a second entity 114 and a third entity 116 may be associated with a security level such as "secret." Entities 112, 114, 116 may include data received via communication channels, representations of physical objects identified by radar, or any other data subject to graphical representation.

The processor 100 may also be connected to one or more input devices 118 and a memory 120. An input device 118 may include any device capable of receiving a user input to select a security level, or an entity having a security level, such as a touch screen, keyboard or voice input. The memory 120 may comprise a data structure to associate entities 112, 114, 116 with a security level.

The system may also include one or more data communication devices 106, 108, 110. Data communication devices 106, 108, 110 may include navigation equipment, identification equipment, communication equipment, or any other device capable of sending, receiving or producing data for representation on a display such as the MLS display 102. Each of the one or more data communication devices 106, 108, 110 may produce or communicate data at varying levels of security. The processor 100 may receive data, and an associated indicator of a security level for such data, from each of the one or more data communication devices 106, 108, 110. Alternatively, a security level for particular data may be inferred based on the nature of the data communication device 106, 108, 110 from which the data was received.

The processor 100 and the MLS display 102 may render data from each of the one or more communication device 106, 108, 110 as one or more entities 112, 114, 116. The security level associated with each entity 112, 114, 116 may correspond to the security level associated with the data used to render the entity 112, 114, 116.

Figure 2:
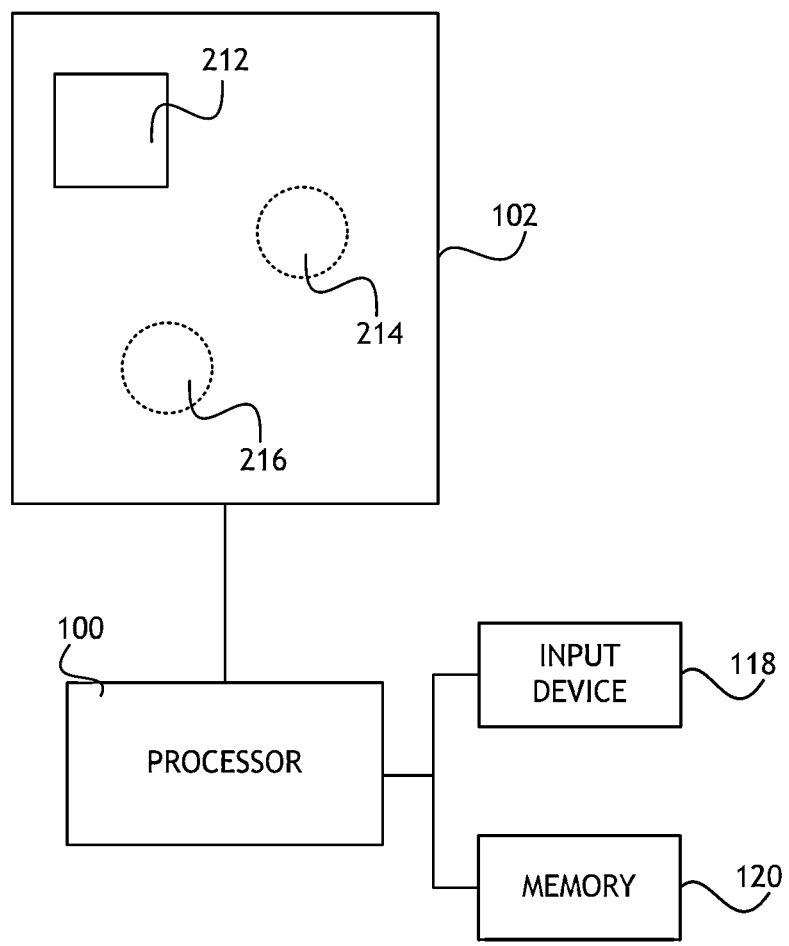
FIG. 2 shows a block diagram of a system displaying de-emphasized entities.

Referring to FIG. 2, a block diagram of a system displaying de-emphasized entities is shown. In a system such as the system shown in FIG. 1, having a processor 100 connected to a MLS display 102, the processor 100 and MLS display 102 may render entities 212, 214, 216 having more than one associated security levels. The entities 212, 214, 216 may be rendered based on data and a security level associated with the data. Such data and associated security level may be stored in a data structure in a memory 120 connected to the processor 100.

A user may select a particular security level associated with one or more entities 212, 214, 216 through an input device 118. The processor 100 and MLS display 102 may render entities 212, 214, 216 in such a way as to emphasize entities 212, 214, 216 associated with the selected security level and de-emphasize entities 212, 214, 216 associated with a different security level. For example, a first entity 212 may be associated with a security level such as "unclassified" while a second entity 214 and a third entity 216 may be associated with a security level such as "secret." A user may select "unclassified" using the input device 118. The processor may reference a data structure in the memory 120 to determine which entities 212, 214, 216 are associated with an "unclassified" security level. The processor 100 and MLS display 102 may then render the second entity 214 and third entity 216 in such a way as to de-emphasize those entities 214, 216. De-emphasizing may include dimming, removing or otherwise visually distinguishing the de-emphasized entities 214, 216 so as to make the entities 212 associated with the selected security level relatively more pronounced. Additionally or alternatively, the processor 100 may emphasize entities 212 associated with the selected security level.

Alternatively, a user may select an entity 212, 214, 216 via an input device capable of allowing direct selection of entities 212, 214, 216. The processor 100 may reference one or more data structures associating the selected entity 212, 214, 216 with a security level. The processor 100 and MLS display 102 may then render entities 212, 214, 216 in such a way as to emphasize entities 212, 214, 216 associated with the security level corresponding to the elected entity 212, 214, 216 and de-emphasize entities 212, 214, 216 associated with a different security level.

De-emphasized entities 214, 216 may continue to be selectable via the input device 118. The processor 100 may designate de-emphasized entities 214, 216 as non-selectable to further enhance de-cluttering and segregation of entities 212, 214, 216 on the MLS display 102. A system according to this embodiment may allow a user to easily distinguish entities 212, 214, 216 based on the security level of each entity 212, 214, 216 and thereby help the user limit disclosure of information to data and entities 212, 214, 216 within a particular security classification. The processor 100 and MLS display 102 may also render a visual indication of the security level associated any emphasized entities 212.

Security levels may be hierarchical such that an authorization to receive data at a particular security level may include an authorization to receive data at all inferior security levels. Where security levels are hierarchical, the processor 100 may de-emphasize entities 212, 214, 216 having superior security levels as compared to a security level selected via an input device 118, but not de-emphasize entities 212, 214, 216 having inferior security levels.

A user may also select, via the input device 118, to return to a default rendering on the MLS display 102. The processor 100 may then re-render all entities 212, 214, 216 normally.

Figure 3:
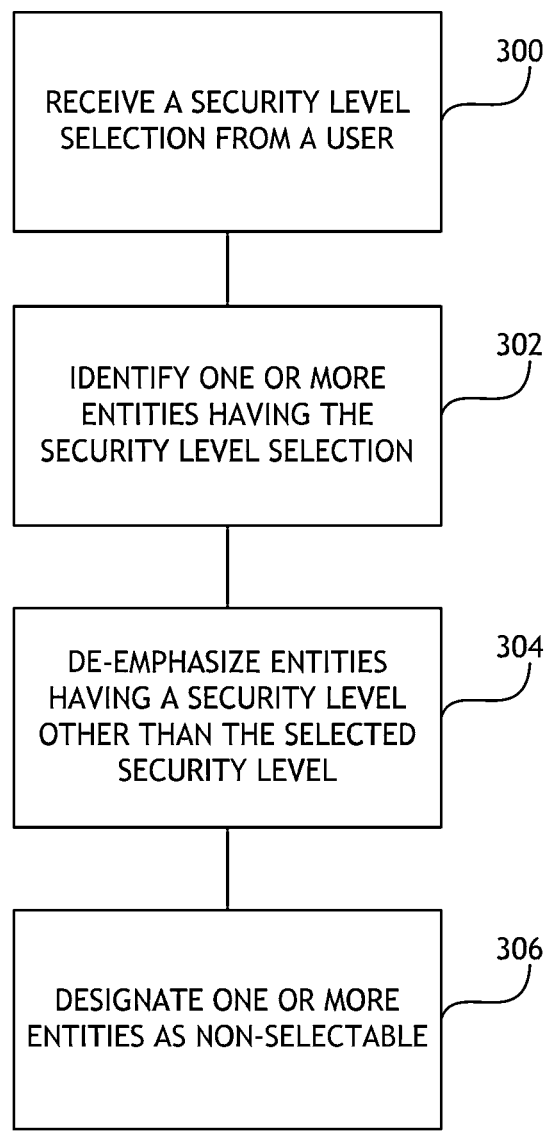
FIG. 3 shows a flowchart for a method of de-cluttering an MLS display.

Referring to FIG. 3, a flowchart for a method of de-cluttering an MLS display is shown. A user may select a desired security level through an input device connected to a processor. The processor may receive 300 the security level selection from the user and identify 302 one or more entities associated with the selected security level. Entities may be associated with a selected security level in a data structure, or data used to render entities may be associated with a security level. Entities associated with a selected security level may include entities associated with an inferior security level in a system where security levels are hierarchical.

The processor may then de-emphasize 304 entities having a security level other than the selected security level such that the entities may be rendered in a visually distinct way. De-emphasis may include dimming the de-emphasized entities or prohibiting the de-emphasized entities from being drawn. The processor may also designate 306 one or more of the de-emphasized entities as non-selectable.

"Security levels" according to the present invention may be relative or absolute. While the foregoing discussion has specifically referenced "unclassified" and "secret" as examples of security levels, security levels may include any appropriate designation. Furthermore, definitions of security levels may not be consistent between systems or networks. A system according to the present invention may interpret security levels as necessary to conform to entities and associated security levels already rendered in the system.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus comprising:
a multi-level security display;
a processor connected to the multi-level security display;
an input device connected to the processor;
two or more data communication devices; and
computer executable program code configured to execute on the processor,
wherein:
the computer executable program code is configured to recognize that a first data communication device of the two or more data communication devices is configured to communicate data at a first security level and a second data communication device of the two or more data communication devices configured to communicate data at a second security level;
the multi-level security display is configured to display a first entity associated with the first data communication device having the first security level and a second entity associated with the second data communication device having the second security level;
the computer executable program code is configured to receive a security level selection from a user via the input device, the security level selection corresponding to the first security level; and
the computer executable program code is configured to render the first entity in a visually distinct way from the second entity.

2. The apparatus of claim 1, wherein the computer executable program code is further configured to remove the second entity from the multi-level security display and prohibit the second entity from being rendered on the multi-level security display.

3. The apparatus of claim 2, wherein the computer executable program code is further configured to designate the second entity as non-selectable.

4. The apparatus of claim 1, wherein the computer executable program code is further configured to dim the second entity relative to the first entity on the multi-level security display.

5. The apparatus of claim 1, further comprising a memory connected to the processor, wherein the memory is configured to store at least one data structure associating at least one entity with a security level.

6. The apparatus of claim 5, wherein the security level selection is received by:
receiving an entity selection from the input device;
referencing the at least one data structure to determine the security level of the selected entity; and
selecting the security level associated with the selected entity.

7. The apparatus of claim 1, wherein:
the multi-level security display is configured to display a third entity having a third security level inferior to the first security level and the second security level;
the first security level is inferior to the second security level; and
the computer executable program code is further configured to render the third entity in a visually distinct way from the second entity.

8. A processor in a display system configured to:
recognize that a first data communication device connected to the processor is configured to communicate data at a first security level and a second data communication device connected to the processor is configured to communicate data at a second security level;
render a first entity associated with the first data communication device having the first security level for display on a multi-level security display;
render a second entity associated with the second data communication device having the second security level for display on a multi-level security display;
receive a security level selection from an input device; and
draw the first entity in a visually distinct way as compared to the second entity.

9. The processor of claim 8, further configured to prohibit drawing the second entity on a multi-level security display when the security level selection corresponds to the first security level.

10. The processor of claim 9, further configured to designate the second entity as non-selectable.

11. The processor of claim 8, further configured to draw the second entity dimly relative to the first entity on a multi-level security display when the security level selection corresponds to the first security level.

12. The processor of claim 11, further configured to designate the second entity as non-selectable.

13. The processor of claim 8, further configured to:
render a third entity having a third security level inferior to the first security level and the second security level for display on a multi-level security display; and
draw the third entity in a visually distinct way as compared to the second entity,
wherein the first security level is inferior to the second security level.

14. The processor of claim 8, further configured to store at least one data structure associating data for rendering at least one entity with a security level.

15. A method for de-cluttering a multi-level security display comprising:
recognizing that a first data communication device connected to a processor is configured to communicate data at a first security level and a second data communication device connected to the processor is configured to communicate data at a second security level;
rendering a first entity associated with the first data communication device having the first security level for display on the multi-level security display;
rendering a second entity associated with the second data communication device having the second security level for display on the multi-level security display;
receiving a security level selection from an input device; and
drawing the first entity in a visually distinct way as compared to the second entity.

16. The method of claim 15, wherein drawing the first entity in a visually distinct way as compared to the second entity includes drawing the second entity invisibly when the security level selection corresponds to the first security level.

17. The method of claim 16, further comprising designating the second entity as non-selectable.

18. The method of claim 15, wherein drawing the first entity in a visually distinct way as compared to the second entity includes drawing the second entity dimly relative to the first entity when the security level selection corresponds to the first security level.

* * * * *